(12) United States Patent
Yoshida

(10) Patent No.: US 9,831,665 B2
(45) Date of Patent: Nov. 28, 2017

(54) OVERCURRENT PROTECTION CIRCUIT

(71) Applicant: DENSO CORPORATION, Kariya, Aichi-pref. (JP)

(72) Inventor: Junichi Yoshida, Kariya (JP)

(73) Assignee: DENSO CORPORATION, Kariya (JP)

( * ) Notice: Subject to any disclaimer, the term of this patent is extended or adjusted under 35 U.S.C. 154(b) by 493 days.

(21) Appl. No.: 14/666,718

(22) Filed: Mar. 24, 2015

(65) Prior Publication Data

US 2015/0288171 A1    Oct. 8, 2015

(30) Foreign Application Priority Data

Apr. 7, 2014 (JP) .................................. 2014-78624

(51) Int. Cl.
*H02H 3/08* (2006.01)
*H02H 3/087* (2006.01)
*H02H 9/02* (2006.01)

(52) U.S. Cl.
CPC .................................. *H02H 9/025* (2013.01)

(58) Field of Classification Search
CPC ............. H02H 3/08; H02H 3/087; H02H 9/02
USPC ........................................................ 361/93.1
See application file for complete search history.

(56) References Cited

U.S. PATENT DOCUMENTS

| 9,537,303 | B2* | 1/2017 | Tanaka | ................ | H03K 17/0822 |
| 2005/0162189 | A1* | 7/2005 | Tanabe | ................ | H03K 17/0822 |
| | | | | | 326/82 |
| 2007/0171590 | A1 | 7/2007 | Nagata et al. | | |
| 2009/0284885 | A1* | 11/2009 | Kojima | ............... | H03K 17/0822 |
| | | | | | 361/93.1 |

FOREIGN PATENT DOCUMENTS

| JP | S59-119623 U | 8/1984 |
| JP | H02-226808 A | 9/1990 |
| JP | 2000-059982 A | 2/2000 |
| JP | 2004-045305 A | 2/2004 |
| JP | 2004-201083 A | 7/2004 |
| JP | 2008-258849 A | 10/2008 |
| JP | 2012-060437 A | 3/2012 |
| JP | 2013-242245 A | 12/2013 |

OTHER PUBLICATIONS

JP-02-226808; Kuraison; Power mosfet with overcurrent protecting function; Oct. 9, 1990; Entire specification and drawings.*
JP-2012-060437; Mar. 22, 2012; Overcurrent protection circuit, entire specificatin and drawings.*

* cited by examiner

*Primary Examiner* — Dharti Patel
(74) *Attorney, Agent, or Firm* — Posz Law Group, PLC

(57) ABSTRACT

A sensing transistor is provided to supply a detection current in proportion to a current flowing to an output transistor. A shunt resistor is connected between a source of the sensing transistor and the ground. A voltage follower circuit receives a terminal voltage of the shunt resistor and have a base-emitter path of each of transistors in a path between its input and its output. An output voltage of the voltage follower circuit is applied to a current generation resistor. A current drawing circuit draws a control current, which corresponds to a current flowing in the current generation resistor, from a gate control line extending from a gate control circuit to a gate of the output transistor.

8 Claims, 7 Drawing Sheets

OVERCURRENT PROTECTION CIRCUIT

CROSS REFERENCE TO RELATED APPLICATION

The present application is based on Japanese patent application No. 2014-78624 filed on Apr. 7, 2014, the contents of which are incorporated herein by reference.

FIELD

The present disclosure relates to an overcurrent protection circuit, which limits a current flowing to a main switching element when the current exceeds a predetermined overcurrent detection threshold.

BACKGROUND

A load of an output transistor (main switching element) such as LDMOS (laterally diffused metal oxide semiconductor), for example, is sometimes short-circuited. When a driving signal for turning on the output transistor, which is short-circuited, an overcurrent exceeding an absolute maximum rated current flows in the output transistor. To counter this problem, an overcurrent protection circuit is provided as exemplarily disclosed in, for example, JP 2012-060437A. The overcurrent protection circuit includes a detection transistor (sensing switching element) and a driving limitation circuit. The detection transistor has a gate connected to a gate of the output transistor to supply a detection current Is, which corresponds to a current Im flowing in the output transistor. The driving limitation circuit draws a driving limitation current corresponding to the detection current Is from a current path, which extends from a gate driving circuit for driving the gate of the output transistor to the gate of the output transistor.

According to the conventional overcurrent protection circuit described above, the current flowing to the output transistor is limited in the following way when a load or the like is short-circuited. That is, when a driving signal for turning on is supplied to the output transistor with the load being short-circuited, the current Im rapidly increases. When the detection current Is increases to a value corresponding to the overcurrent detection threshold of the current Im, a gate capacitance is prevented from being charged because the driving limitation current is drawn from the current path extending to the gate of the output transistor. As a result, a gate-source voltage of the output transistor and hence the current Im are limited.

In the conventional overcurrent protection circuit described above, a current mirror circuit, which is formed of bipolar transistors for example, is used as the driving limitation circuit. The conventional overcurrent protection circuit thus has the following problems. That is, the overcurrent detection threshold varies with a forward voltage Vf of a transistor, which is connected in a current flow path of the detection current Is among transistors forming the current mirror circuit. For this reason, in the conventional overcurrent protection circuit, the overcurrent detection threshold varies due to a temperature characteristic of the forward voltage Vf. When the overcurrent detection threshold varies to delay a start of limiting the current Im, an overcurrent tends to flow to the output transistor and, in a worst case, causes thermal breakdown of the output transistor. When the overcurrent detection value varies to advance the start of limiting the current, the current Im flowing to the output transistor normally tends to be limited too early.

Further, in the conventional overcurrent protection circuit, the current mirror circuit does not operate until a voltage between main terminals of the output transistor reaches the forward voltage Vf. In this case, the driving limitation current is not drawn and hence the current Im is not limited. That is, in the conventional overcurrent protection circuit has a dead zone, in which the current Im cannot be limited. Because of the dead zone, the overcurrent detection threshold need be set high. With such a high threshold, the current Im cannot be limited timely and tends to break the output transistor down depending on a rate of change (slew rate) of the current Im at the time of an occurrence of a short-circuit failure. The dead zone tends to arise more as an on-resistance of the output transistor decreases, that is, as its size increases.

For the above-described reasons, when the conventional overcurrent protection circuit is used, the absolute maximum rated value of a drain current of the output transistor is designed to be far higher than a desired specification (designed to provide a large margin) thereby to avoid occurrence of the above-described problems. However, such a design adversely causes a problem that a chip area of the output transistor and hence an entire circuit area increases.

SUMMARY

It is therefore an object to provide an overcurrent protection circuit, which suppresses a predetermined overcurrent detection threshold from varying with temperature.

According to one aspect, an overcurrent protection circuit for limiting a current when a current flowing in a main switching element, which is driven by a gate driving circuit, exceeds an overcurrent detection threshold comprises a sensing switching element, a shunt resistor, a voltage follower circuit, a current generation resistor and a current drawing circuit. The sensing switching element is configured to supply a detection current in proportion to a current flowing in the main switching element. The shunt resistor is provided to generate a terminal voltage corresponding to the detection current. The voltage follower circuit receives the terminal voltage of the shunt resistor. The current generation resistor receives an output voltage of the voltage follower circuit. The current drawing circuit draws a control current, which corresponds to a current flowing in the current generation resistor, from a current path extending from the gate driving circuit to a gate of the main switching element.

The voltage follower circuit has, in a path from an input to an output thereof, a base-emitter path of a PNP type bipolar transistor and a base-emitter path of an NPN type bipolar transistor. Alternatively, the voltage follower circuit has, in the path from the input to the output thereof, a gate-source path of a P-channel type MOS transistor and a gate-source path of an N-channel type MOS transistor.

DETAILED DESCRIPTION OF THE EMBODIMENT

Figure 1:
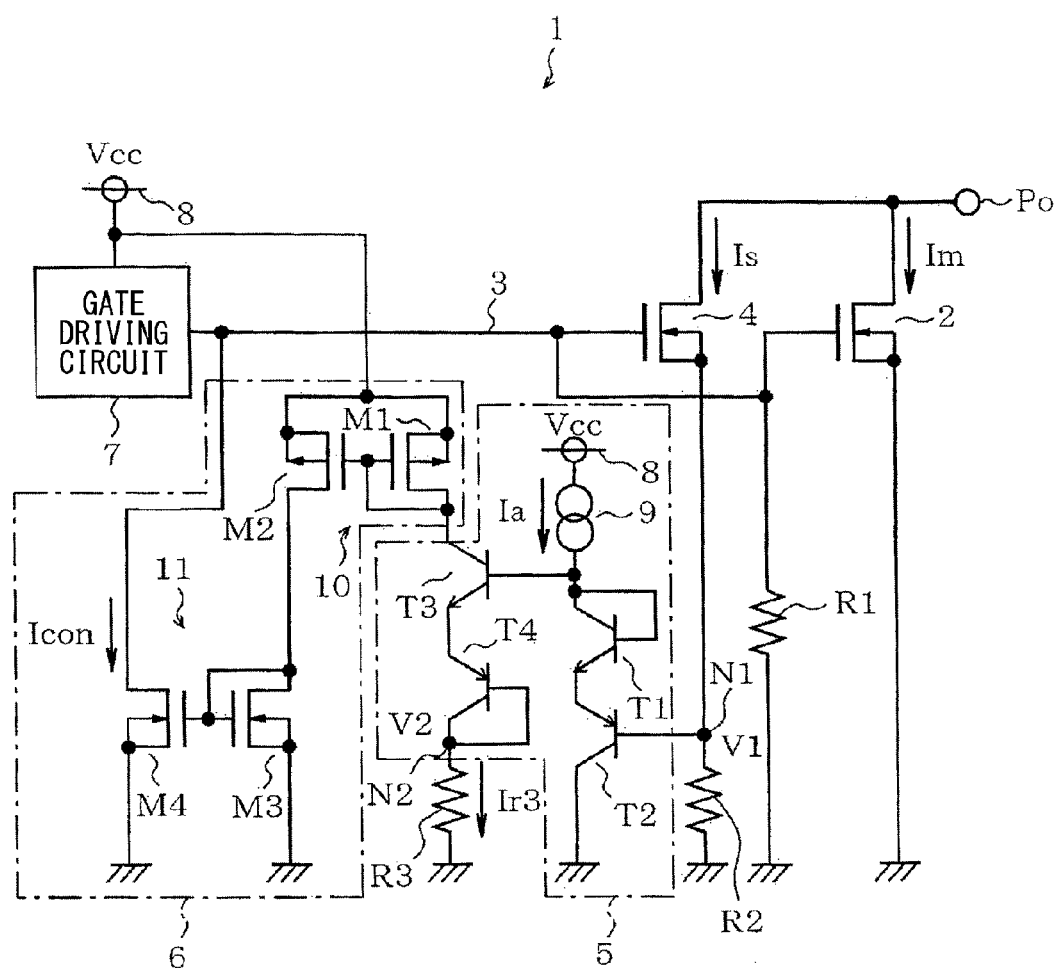
FIG. 1 is a wiring diagram showing a first embodiment of an overcurrent protection circuit provided in a load driving apparatus.

An overcurrent protection circuit will be described below with reference to plural embodiments shown in the drawings. In each embodiment, substantially same configurations are indicated by the same reference numerals for simplicity.

First Embodiment

Referring first to FIG. 1 showing a first embodiment, an overcurrent protection circuit 1 is configured as a semiconductor integrated circuit device for a vehicle, for example. The overcurrent protection circuit 1 is provided to limit a current Im flowing between a drain and a source of a transistor 2, which is an N-channel LDMOS corresponding to a main switching element, from exceeding a predetermined overcurrent detection threshold Ith to protect the transistor 2 from an overcurrent. In the first embodiment, a normal value of the current Im is 2 A and the overcurrent detection threshold Ith is set to be 4 A.

The transistor 2 is for driving a load (not shown) connected between an output terminal Po and a power source terminal (not shown). A drain and a source of the transistor 2 are connected to the terminal Po and the ground, respectively. That is, the transistor 2 is an output transistor of a load driving device, which has a low-side driving configuration. A gate of the transistor 2 is connected to the ground through a pull-down resistor R1 and connected to a gate control line 3 corresponding to a current path leading to the gate of the main switching element.

The overcurrent protection circuit 1 includes a transistor 4, a shunt resistor R2, a voltage follower circuit 5, a current generation resistor R3 and a current drawing circuit 6. The transistor 4, which corresponds to a sensing switching element and an N-channel LDMOS, is provided to supply a detection current Is in proportion to the current Im flowing to the transistor 2. That is, the transistors 2 and 4 have gates connected in common, that is, connected to each other, and drains connected in common. In the first embodiment, a ratio of sizes (size ratio) of the transistors 2 and 4 is, for example, 200:1. A normal value of the detection current Is is therefore 1 mA. Both transistors 2 and 4 are driven by a gate driving circuit 7.

The gate driving circuit 7 operates with power supply of power voltage Vcc (for example, 5 V) supplied from a power line 8. In response to an on-command signal supplied from an external side, the gate driving circuit 7 outputs a constant current of 1 mA, for example, to the gate control line 3 to drive the gates of the transistors 2 and 4 with the same constant current. In response to an off-command signal from the external side, the gate driving circuit 7 stops outputting the constant current. The transistor 2 is configured to turn on normally when a current of 500 µA is supplied to the gate thereof.

The shunt resistor R2 is provided to generate a voltage corresponding to the detection current Is at terminals thereof. The transistor R2 is connected between the source of the transistor 4 and the ground. A voltage V1 developed at a common connection node N1 between the transistor 4 and the shunt resistor R2 is supplied to the voltage follower circuit 5.

The voltage follower circuit 5 includes a current source 9 and transistors T1 to T4. The current source 9 operates with the power voltage Vcc supplied from the power line 8 and outputs a constant current Ia. A collector of the transistor T1, which is an NPN type bipolar transistor, is connected to an output terminal of the current source 9. The NPN type bipolar transistor T1 is in a diode-connected configuration with its collector and base being connected in common. An emitter of the NPN type bipolar transistor T1 is connected to an emitter of a transistor T2, which is a PNP type bipolar transistor. A collector and a base of the PNP type bipolar transistor T2 are connected to the ground and the node N1, respectively.

The output terminal of the current source 9 is connected also to a base of a transistor T3, which is an NPN type bipolar transistor. A collector of the NPN type bipolar transistor T3 is connected to the current drawing circuit 6. An emitter of the NPN type bipolar transistor T3 is connected to an emitter of a PNP type bipolar transistor T4. The PNP type bipolar transistor T4 is in a diode-connected configuration, in which its base and collector are connected in common. The collector and the base of the PNP type bipolar transistor T4 are connected to an output node N2 of the voltage follower circuit 5.

According to the circuit configuration described above, an output voltage V2 of the voltage follower circuit 5 almost equals the input voltage V1 of the voltage follower circuit 5 during a period, in which the transistors Ti to T4 are being in on-states. This relation is expressed as the following equation (1), in which forward voltages of the transistors T1 to T4 are assumed as Vf.

$$V2 = V1 + 2 \times Vf - 2 \times Vf \qquad (1)$$

A current generation resistor R3 is provided to be supplied with the output voltage V2 of the voltage follower circuit 5. That is, the current generation resistor 3 is connected between the output node N2 of the voltage follower circuit 5, that is, the collector of the PNP type bipolar transistor T4, and the ground. With this configuration, a current Ir3 flows in the current generation resistor R3 in correspondence to the voltage V2 ($\approx$V1).

The current drawing circuit 6 is for drawing a control current Icon, which corresponds to the current Ir3 flowing in the current generation resistor R3, from the gate control line 3. The current drawing circuit 6 includes transistors M1 to M4. The transistors M1 and M2 are P-channel MOS transistors and form an input-side current mirror circuit 10. That is, the transistors Mi and M2 have sources connected in common and gates connected in common.

The common sources of the transistors M1 and M2 are connected to the power supply line 8. The gate and a drain of the transistor M1 are connected in common and connected to the collector of the NPN type bipolar transistor T3 of the voltage follower circuit 5. A drain of the transistor M2 is connected to a drain of the transistor M3.

The transistors M3 and M4, which are N-channel MOS transistors, form an output-side current mirror circuit 11. That is, the transistors M3 and M4 have gates connected in common and sources connected in common. The common sources of the transistors M3 and M4 are connected to the ground. The gate and the drain of the transistor M3 are connected in common. The drain of the transistor M4 is connected to the gate control line 3.

According to the current drawing circuit 6 configured as above, an input current of the current mirror circuit 10, that is, a current flowing to the transistor M1, becomes the current Ir3, which flows to the current generation resistor R3. An output current of the current mirror circuit 11, that is, a current flowing to the transistor M4 and hence the control current Icon, is determined in correspondence to the current Ir3.

In the first embodiment, resistances of the resistors R2 and R3 (resistance ratio) as well as sizes of the transistors M1 to M4 (size ratio) are set to satisfy a condition that the control current Icon becomes 500 µA when the detection current Is is 1 mA (normal time), that is, the control current Icon becomes 1 mA when the detection current Is is 2 mA (overcurrent time). In this case, after setting one of the resistance ratio and the size ratio, the other of the ratios may be set to satisfy the above-described condition. Alternatively, both of the resistance ratio and the size ratio may be set to satisfy the above-described condition.

An operation of the overcurrent protection circuit 1 in normal time will be described next. When the power voltage Vcc exceeds a voltage value (=2×Vf) of a sum of the forward voltages of the transistors T1 and T2, the current source 9 starts supplying the constant current Ia. Thus the transistors T1 to T4 and the transistors M1 to M4 turn on. The gate driving circuit 7 turns on the transistors 2 and 4 by outputting the constant current of 1 mA to the gate control line 3 when the on-command signal is applied.

When the current Im flowing in the transistor 2 is equal to or lower than the normal value, which is 2 A, the detection current Is flowing to the transistor 4 becomes equal to or lower than 1 mA. The control current Icon drawn from the gate control line 3 by the current drawing circuit 6 becomes equal to or lower than 500 µA. Since the current of 500 µA or higher is supplied to the gate of the transistor 2, the transistor 2 is turned on normally.

An operation of the overcurrent protection circuit 1 at overcurrent time will be described next. When the current Im flowing to the transistor 2 reaches 4 A, the detection current Is flowing to the transistor 4 becomes 2 mA. The control current Icon, which is drawn from the gate control line 3 by the current drawing circuit 6, becomes 1 mA. That is, all the current supplied from the gate driving circuit 7 is drawn to the ground by the current drawing circuit 6. No current is supplied to the gate of the transistor 2 and a gate capacitance is not charged. As a result, a gate-source voltage Vgs of the transistor 2 falls below a threshold voltage Vt and turns off the transistor 2. The current Im of the transistor 2 thus becomes 0.

As described above, according to the overcurrent protection circuit 1 of the first embodiment, even when the transistor 2 or the load driven by the transistor 2 fails because of, for example, short-circuiting, which allows the overcurrent to flow in the transistor 2, the current Im flowing in the transistor 2 is limited by the overcurrent protection operation described above. In this case, the detection current Is, which is proportional to the current Im, is converted to the voltage V1 by the shunt resistor R2 and inputted to the voltage follower circuit 5. The control current Icon is determined by the output voltage V2 of the voltage follower circuit 5 and the current generation resistor R3 and is drawn from the gate control line 3 by the current drawing circuit 6. For this reason, a temperature characteristic of the overcurrent detection threshold Ith in the overcurrent protection circuit 1 largely depends on a temperature characteristic of the voltage follower circuit 5.

The voltage follower circuit 5 is however configured to output the output voltage V2, which is increased by an amount of 2×Vf and decreased by an amount 2×Vf from the input voltage V2. According to this configuration, even when the forward voltages Vf of the transistors T1 to T4 forming the voltage follower circuit 5 vary with temperature, the variations are cancelled out and a variation in the output voltage V2 and hence the control current Icon due to temperature is reduced to be very small. According to the configuration of the first embodiment, the overcurrent detection threshold Ith, that is, the current value for limiting the current Im, is suppressed from varying with temperature.

In addition, in the overcurrent protection circuit 1, the voltage follower circuit 5 and the current drawing circuit 6 operate irrespectively of the drain-source voltage of the transistor 2. For this reason, the overcurrent protection circuit 1 has no dead zone, in which the current Im is not limited as in the conventional overcurrent protection circuit. As described above, the transistor 2 need not be designed to have a large margin and may be designed in an appropriate size. For this reason, a chip area of the transistor 2 and hence a circuit area of an entire load driving device can be suppressed from increasing unnecessarily. Since no dead zone is present, the overcurrent detection threshold Ith can be set more freely.

The forward voltages of the bipolar transistors have slightly different temperature characteristics between the NPN type and the PNP type. However, the voltage follower circuit 5 is configured to output the voltage V2, which is increased from the input voltage V1 by the amount of the forward voltages of the NPN type and PNP type bipolar transistors (T1, T2) and decreased from the input voltage by the amount of the forward voltages of the NPN type and PNP type bipolar transistors (T3, T4). As a result, it is possible to suppress even a slight variation in the overcurrent detection threshold Ith, which is caused by a difference between the temperature characteristics of the forward voltages of the NPN type and the PNP type.

The overcurrent protection circuit 1 is not configured with amplifiers and comparators. In a circuit configuration using amplifiers and comparators, it is likely to become difficult to control such components. However, the overcurrent protection circuit 1 described above is free from such a problem and more advantageous than such a comparative example of using the amplifiers and comparators in that a circuit size can be reduced.

Second Embodiment

Figure 2:
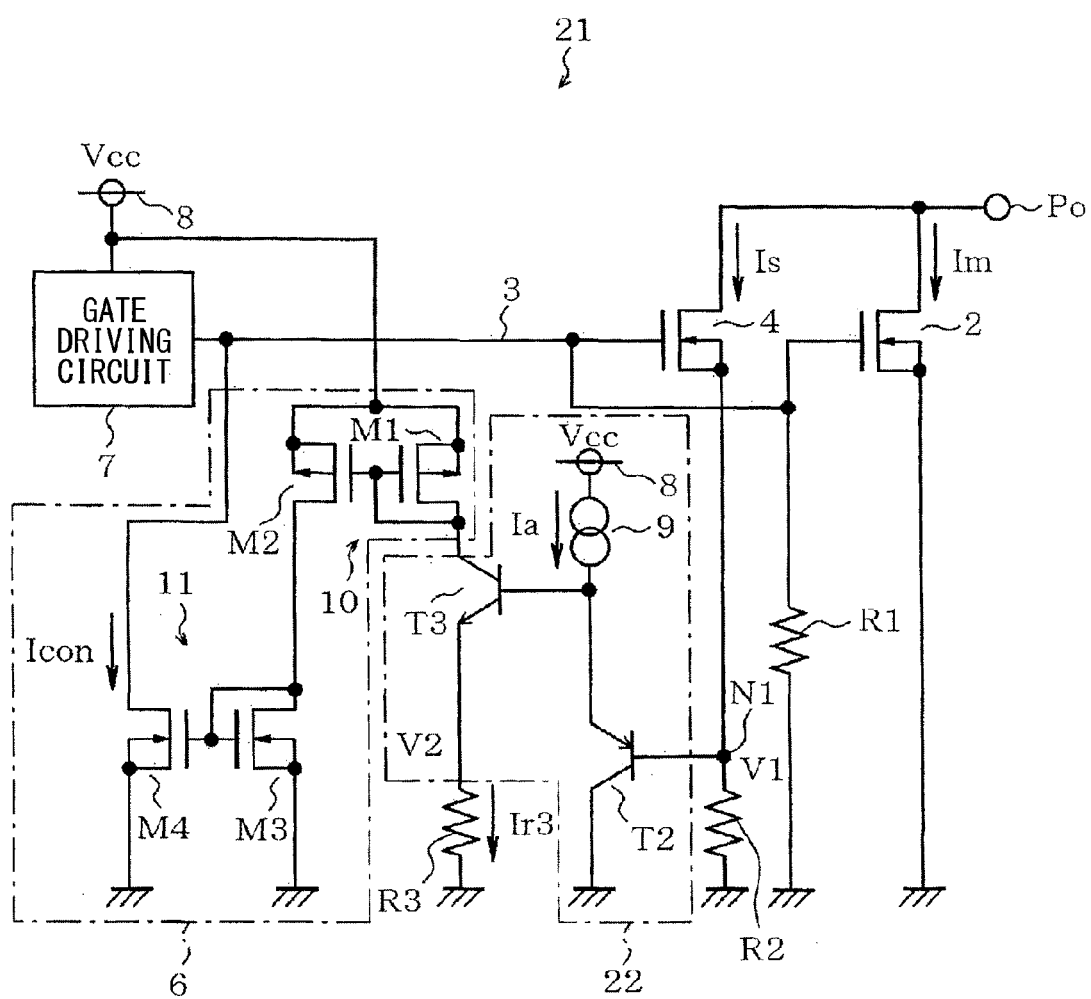
FIG. 2 is a wiring diagram showing a second embodiment in correspondence to FIG. 1.

Referring to FIG. 2 showing a second embodiment, an overcurrent protection circuit 21 is different from the overcurrent protection circuit 1 of the first embodiment in that a voltage follower circuit 22 is provided in place of the voltage follower circuit 5. In the voltage follower circuit 22, the voltage follower circuit 5 is not provided with the transistors T1 and T4.

The emitter of the PNP type bipolar transistor T2 is connected to the output terminal of the power source 9 and the base of the NPN type bipolar transistor T3. The emitter of the NPN type bipolar transistor T3 is connected to the ground through the current generation resistor R3 as the output node of the voltage follower circuit 22.

According to this configuration, the output voltage V2 of the voltage follower circuit 22 generally equals the voltage value of the input voltage V1 of the voltage follower circuit 22 during a period, in which the transistors T2 and T3 are both in the on-states, as expressed by the following equation (2).

$$V2 = V1 + Vf - Vf \tag{2}$$

The overcurrent protection circuit 21 according to the second embodiment can also realize the similar overcurrent protection operation as the overcurrent protection circuit 1. However, the voltage follower circuit 22 is configured to output the output voltage V2 by increasing and decreasing the input voltage V1 by an amount of the forward voltage of the PNP type and an amount of the forward voltage of the NPN type, respectively. Accordingly, the overvoltage detection threshold Ith slightly varies because of a difference in the temperature characteristics of the forward voltages of the NPN type and the PNP type.

However, according to the second embodiment, the voltage follower circuit 22 and the current drawing circuit 6 start to operate to output the constant current Ia when the power voltage Vcc exceeds the forward voltage of the PNP type bipolar transistor T2. It is therefore advantageous in that a minimum operation voltage of the overcurrent protection circuit 21 is lowered in comparison with the first embodiment. Thus, the first embodiment may be used in a case that the overcurrent should be detected with high accuracy and the second embodiment may be used in a case that the overcurrent need not be detected with such high accuracy.

Third Embodiment

Figure 3:
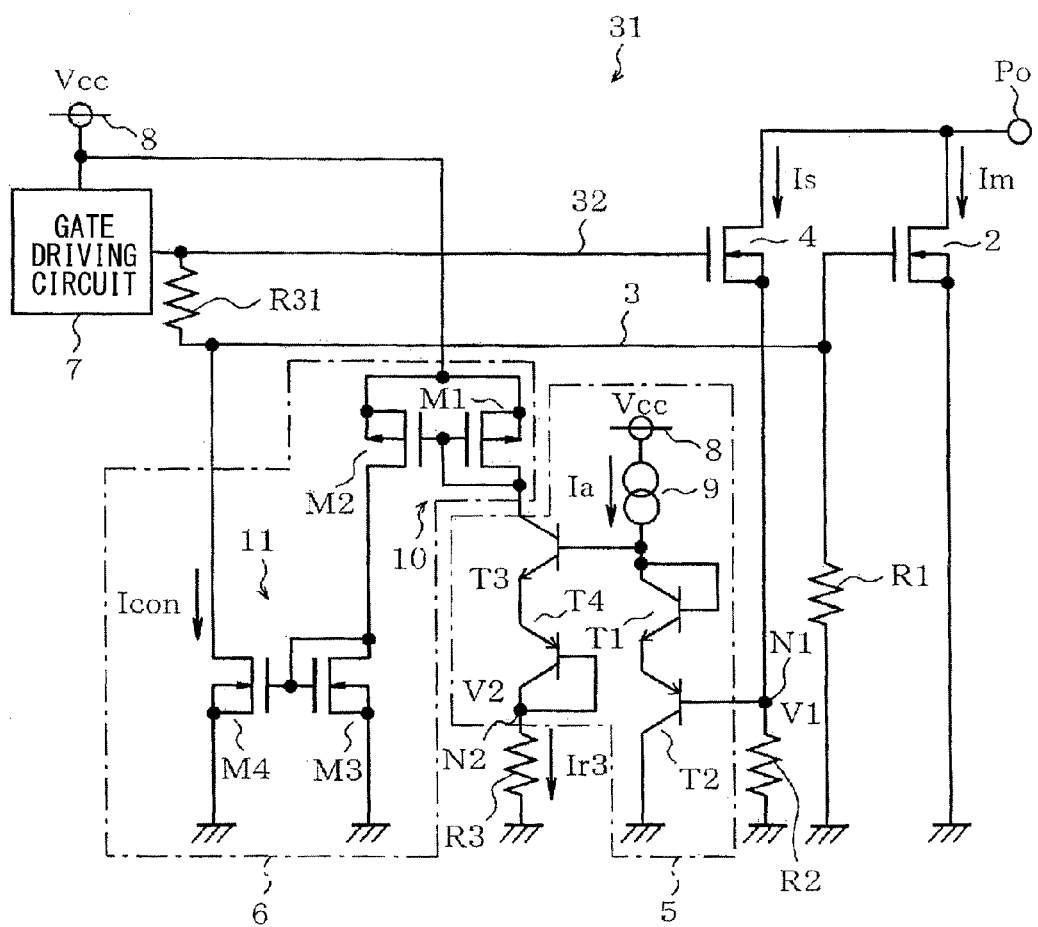
FIG. 3 is a wiring diagram showing a third embodiment in correspondence to FIG. 1.

Referring to FIG. 3 showing a third embodiment, an overcurrent protection circuit 31 is different from the overcurrent protection circuit 1 of the first embodiment in that a feedback resistor R31 is additionally provided. The feedback resistor R31 is provided to be in series with the gate control line 3. The gate driving circuit 7 drives the gate of the transistor 2 with a constant current through the feedback resistor R31 and the gate control line 3 and drives the gate of the transistor 4 with a constant current through a gate control line 32. That is, the feedback resistor R31 is provided to be in a current path, which extends from the gate driving circuit 7 to the gate of the transistor 2 but is different from the current path extending to the gate of the transistor 4.

A resistance Rsen of the shunt resistor R2 and a resistance Rfb of the feedback resistor R31 are set to satisfy the following equation (3). Here, current values of the detection current Is and the control current Icon, which are produced when the current Im equals the overcurrent detection threshold Ith (=4 A), are assumed to be Isdc (=2 mA) and Icondc (=1 mA), respectively.

$$Isdc \times Rsen = Icondc \times Rfb \quad (3)$$

In each of the foregoing embodiments, the source voltage of the transistor 4 is higher than 0 V by an amount of a value (Is×Rsen) while the source voltage of the transistor 2 is 0V. That is, in the foregoing embodiments, the gate-source voltages Vgs are different because the transistors 2 and 4 have different source voltages relative to the same gate voltages. When the gate-source voltages Vgs of the transistors 2 and 4 thus differ, A ratio of currents (current ratio) between the current Im and the detection current Is does not become the desired ratio (200:1). As a result, the accuracy of current detection is lowered, that is, the detection current Is is not proportional to the current Im.

According to the third embodiment, on the other hand, since the feedback resistor R31 is provided additionally, the gate voltage of the transistor 2 becomes lower than the gate voltage of the transistor 4 by the amount (Icon×Rfb). However, the source voltages of the transistors 2 and 4 are set to satisfy the same relation as in the foregoing embodiments. The resistance Rsen of the shunt resistor R2 and the resistance Rfb of the feedback resistor R31 are set to satisfy the equation (3) described above.

Accordingly, in the third embodiment, when the current Im equals the overcurrent detection threshold Ith, an increase amount (=Isdc×Rsen) of the source voltage of the transistor 4 relative to the source voltage of the transistor 2 equals a decrease amount (=Icondc×Rfb) of the gate voltage of the transistor 2 relative to the gate voltage of the transistor 4. Thus, when the current Im equals the overcurrent detection threshold Ith, the gate-source voltages Vgs of the transistors 2 and 4 also become equal to each other. For this reason, according to the third embodiment, the accuracy of the ratio of currents between the current Im and the detection current Is is improved and hence the accuracy of detection of the overcurrent is improved advantageously.

Fourth Embodiment

Figure 4:
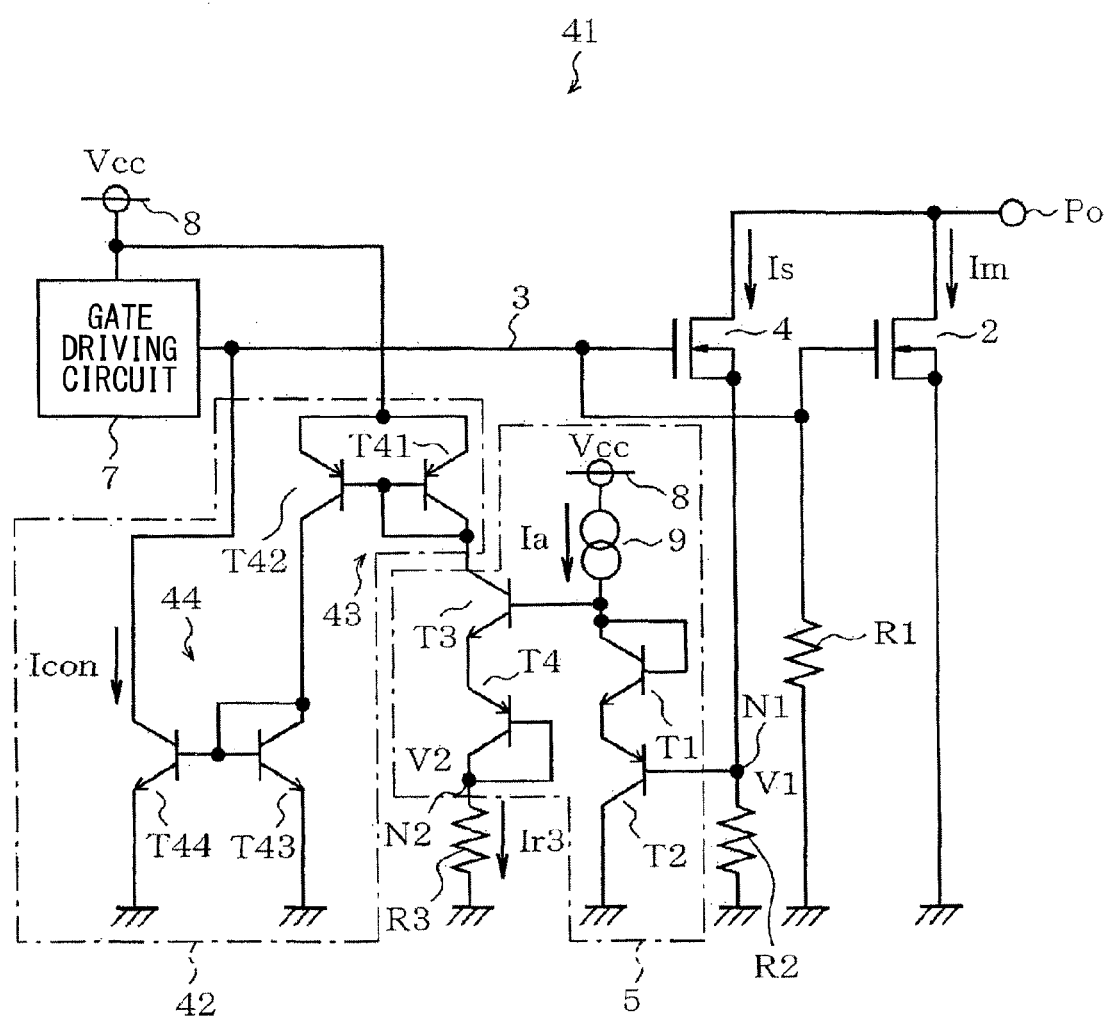
FIG. 4 is a wiring diagram showing a fourth embodiment in correspondence to FIG. 1.

Referring to FIG. 4 showing a fourth embodiment, an overcurrent protection circuit 41 is different from the overcurrent protection circuit 1 of the first embodiment in that a current drawing circuit 42 is provided in place of the current drawing circuit 6. In the current drawing circuit 42, bipolar transistors are used in place of the MOS transistors used in the current drawing circuit 6.

In this configuration, transistors T41 and T42, which are PNP type bipolar transistors, form an input-side current mirror circuit 43. Transistors T43 and T44, which are NPN type bipolar transistors, form an output-side current mirror circuit 44.

Similarly to the current drawing circuit 6, the current drawing circuit 42 can draw the control current Icon, which is determined by the current Ir3 flowing in the current generation resistor R3, from the gate control line 3. Therefore, the overcurrent protection circuit 41 according to the fourth embodiment can also perform the similar overcurrent protection operation as the overcurrent protection circuit 1 of the first embodiment.

Fifth Embodiment

Figure 5:
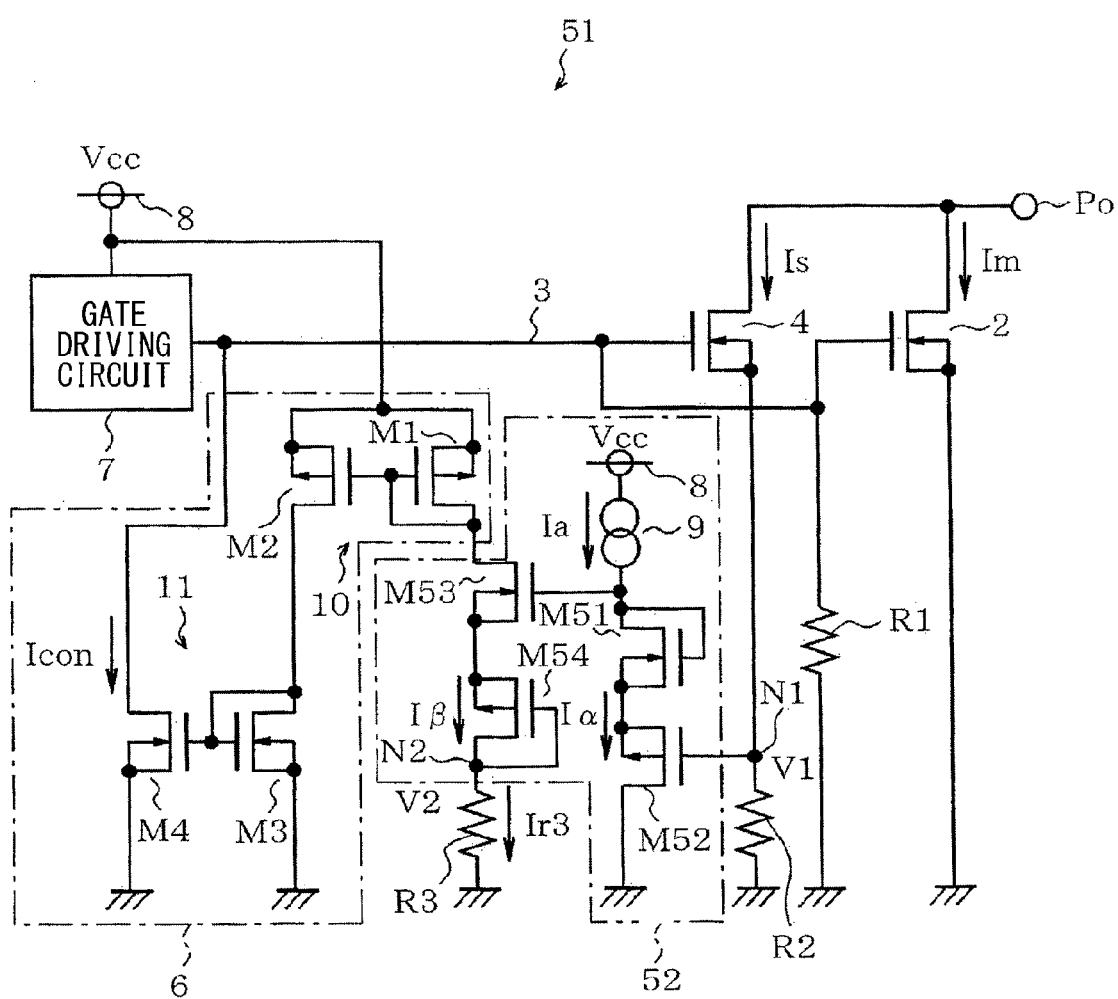
FIG. 5 is a wiring diagram showing a fifth embodiment in correspondence to FIG. 1.

Referring to FIG. 5 showing a fifth embodiment, an overcurrent protection circuit 51 is different from the overcurrent protection circuit 1 of the first embodiment in that a voltage follower circuit 52 is provided in place of the voltage follower circuit 5. In the voltage follower circuit 52, MOS transistors are used in place of the bipolar transistors used in the voltage follower circuit 5.

In this configuration, a drain of a transistor M51, which is an N-channel type MOS transistor, is connected to the output terminal of the current source 9. The N-channel type MOS transistor M51 has a diode-connected configuration, in which a drain and a gate are connected in common. The source of the N-channel type MOS transistor M51 is connected to a source of a transistor M52, which is a P-channel type MOS transistor. A drain of the P-channel type MOS transistor M52 is connected to the ground and a gate thereof is connected to the node N1.

The output terminal of the current source 9 is connected to a gate of a transistor M53, which is an N-channel type MOS transistor. A drain of the N-channel type MOS transistor M53 is connected to the current drawing circuit 6. A source of the transistor 53 is connected to a source of a P-channel type MOS transistor M54. The transistor 54 has a diode-connected configuration, in which a gate and a drain of the transistor 54 are connected in common. The drain and the gate of the P-channel type MOS transistor M54 are connected to the output node N2 of the voltage follower circuit 52.

With this configuration, the output voltage V2 of the voltage follower circuit 52 generally equals the input voltage V1 of the voltage follower circuit 52 during a period, in which the transistors M51 to M54 are in the on-states, as expressed by the following equation (4). Here, threshold voltages of the transistors M51 to M54 are assumed to be Vt.

$$V2=V1+2\times Vt-2\times Vt \qquad (4)$$

Accordingly, the overcurrent protection circuit 51 can also perform the overcurrent protection operation similarly to the overcurrent protection circuit 1 of the first embodiment. The threshold voltage Vt of the MOS transistor, however, varies largely in correspondence to the current, which flows in the drain-source path. For this reason, it is likely that the accuracy in overcurrent detection is lowered in the above-described configuration. In the fifth embodiment, a current value of the current Ia is set such that a current Ia flowing in the transistors M51 and M52 equals a current Iβ flowing in the transistors M53 and M54 when the current Im equals the current detection threshold Ith. With this setting, when the current equals the overcurrent detection threshold Ith, the threshold voltages Vt of the transistors M51 to M54 generally equal one another. As a result, the overcurrent detection can be performed with high accuracy.

Sixth Embodiment

Figure 6:
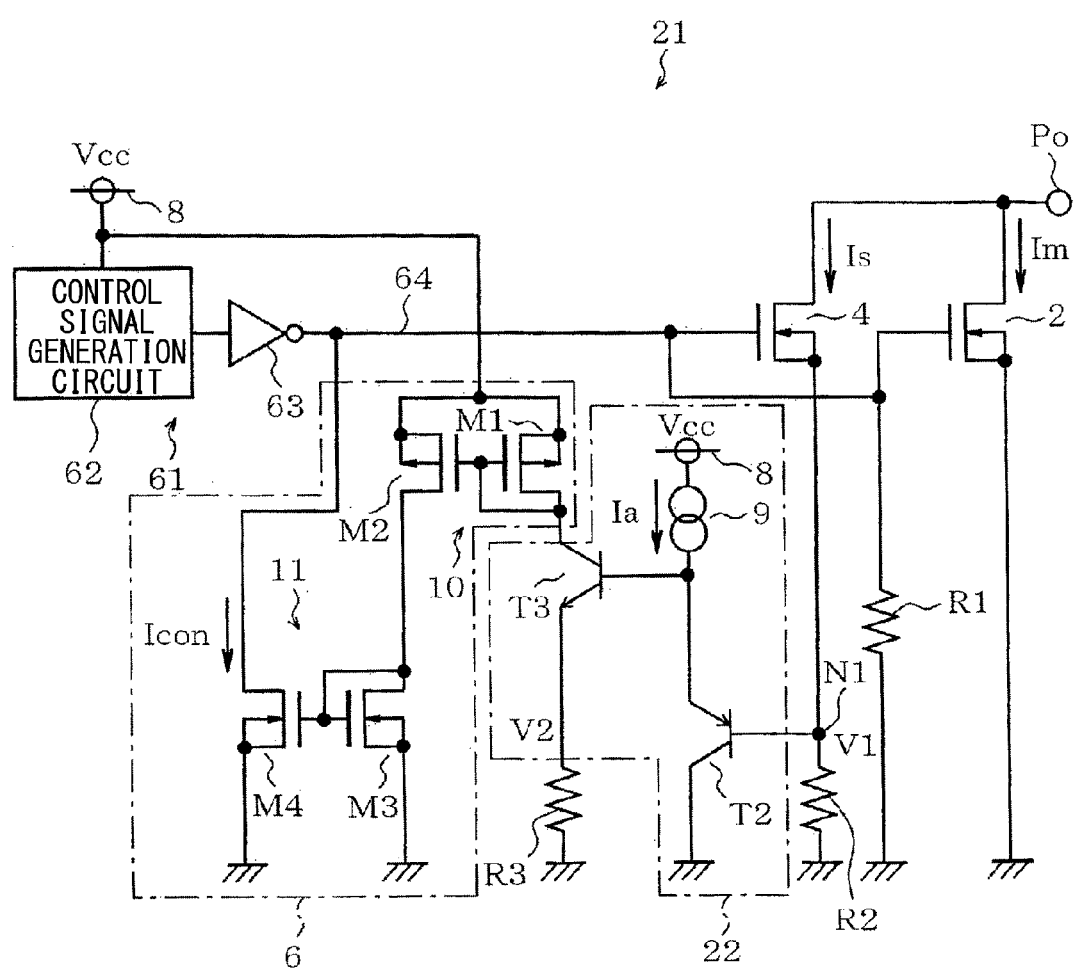
FIG. 6 is a wiring diagram showing a sixth embodiment in correspondence to FIG. 1.

Referring to FIG. 6 showing a sixth embodiment, an overcurrent protection circuit is configured to be applicable to drive the gate of the main switching element with a constant voltage, while the overcurrent protection circuits in the foregoing embodiments are configured to be applied to drive the gate of the main switching element with the constant current as an example. Assuming that the overcurrent protection circuit 21 is applied to drive the gate of the main switching element in the overcurrent protection circuit 21 shown in FIG. 2 with the constant voltage, the overcurrent protection circuit 21 is configured as shown in FIG. 6.

In FIG. 6, a gate driving circuit 61 includes a control signal generation circuit 62 and an inverter 63. The control signal generation circuit 62 operates with a supply of the power voltage Vcc and generates a control signal for driving the transistor 2 to turn on and off in response to a command signal supplied from the external side. The inverter 63 is configured as a CMOS circuit, for example, to output a driving voltage (on-driving voltage or off-driving voltage) of a predetermined level, which corresponds to an inverted logical level of a control signal supplied from the control signal generation circuit 62. An output terminal of the inverter 63 is connected to the gates of the transistors 2 and 4 through a gate control line 64 corresponding to a current path extending to the gate of the main switching element.

In this configuration, the current drawing circuit 6 draws the control current Icon from the gate control line 64 to the ground. The current value Icondc of the control current Icon is set to become higher than a current capacity of a P-channel MOS transistor (not shown), which forms a high-side of the inverter 63, when the current Im equals the overcurrent detection threshold Ith (overcurrent time).

In this configuration, when the current Im equals the overcurrent detection threshold Ith, the current drawing circuit 6 draws the control current Icon, which exceeds the current capacity of the P-channel type MOS transistor of the inverter 63, from the gate control lime 64 to the ground. Thus the on-driving voltage is not supplied from the gate driving circuit 61 to the gate of the transistor 2 and the gate capacitance is not charged. As a result, since the gate-source voltage Vgs of the transistor 2 falls to be lower than the threshold voltage Vt and the transistor 2 is turned off, the current Im becomes zero. The present embodiment thus also provides the similar overcurrent protection operation as the other embodiments described above.

Seventh Embodiment

Figure 7:
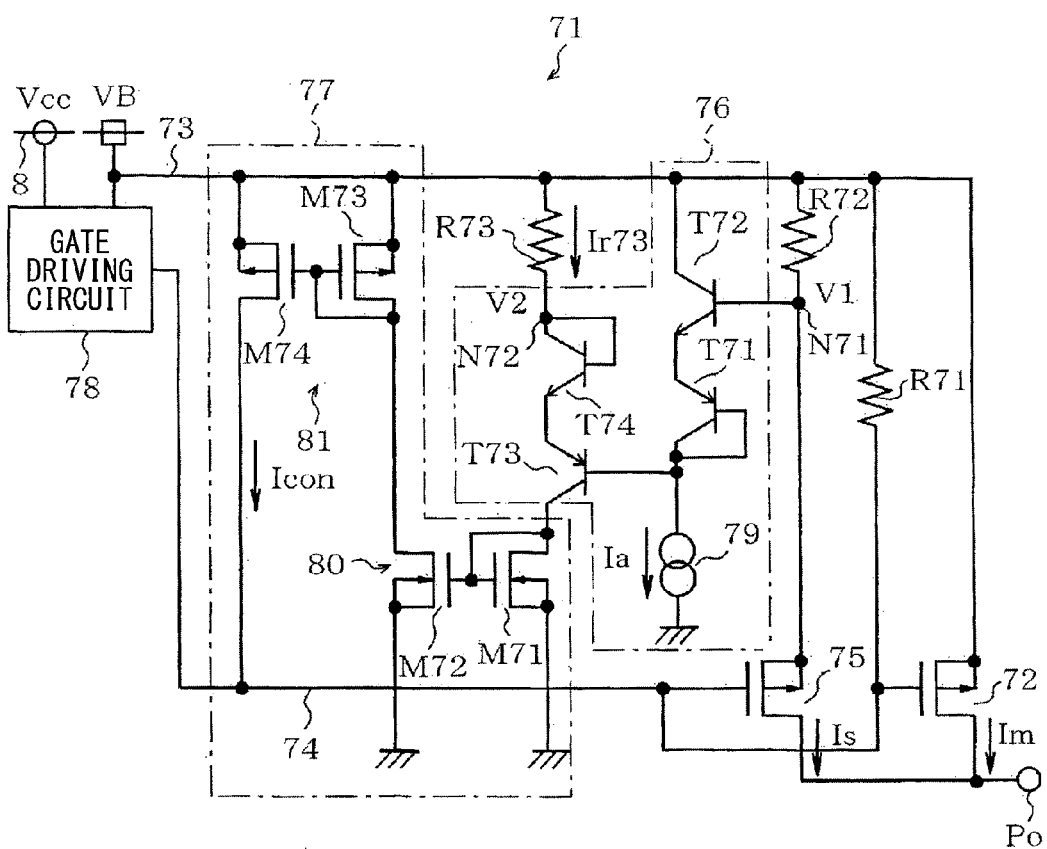
FIG. 7 is a wiring diagram showing a seventh embodiment in correspondence to FIG. 1.

Referring to FIG. 7 showing a seventh embodiment, an overcurrent protection circuit 71 has the similar function as the overcurrent protection circuit 1 of the first embodiment and protects a transistor 72 corresponding to a main switching element, which is a P-channel LDMOS, from an overcurrent. The transistor 72, which forms an output transistor, is provided to be driven at a high side relative to the foregoing embodiments, in which the subject for protection by the overcurrent protection circuit is the output transistor provided to be driven at the low side.

The transistor 72 is for driving a load (not shown) connected between the output terminal Po and the ground. A source and a drain of the transistor 72 are connected to a power line 73, to which a battery voltage VB (for example, 12 V) is supplied, and the terminal Po, respectively. That is, the transistor 72 is the output transistor of the load driving device of a high-side driving type. A gate of the transistor 72 is connected to the power line 73 through a pull-up resistor R71 and also to a gate control line 74 corresponding to a current path extending to the gate of the main switching element.

The overcurrent protection circuit 71 includes a transistor 75, a shunt resistor R72, a voltage follower circuit 76, a current generation resistor R73 and a current drawing circuit 77. The transistor 75 corresponding to a sensing switching element, which is a P-channel type LDMOS, is provided to supply a detection current Is proportional to a current Im flowing in the transistor 72. A size ratio between the transistors 72 and 75 is the same as that between the transistors 2 and 4. Both of the transistors 72 and 75 are driven by a gate driving circuit 78.

The gate driving circuit 78 operates with the power voltage Vcc supplied from the power line 8 and the battery voltage VB supplied from the power line 73. When an on-command signal is supplied from an external side, the gate driving circuit 78 charges a gate capacitance by inputting a constant current of 1 mA, for example, from the gate control line 74 and drives the gates of the transistors 72 and 75 with constant currents. When an off-command signal is supplied form the external side, the gate driving circuit 78 stops inputting the constant current.

The shunt resistor R72 is provided to develop a voltage corresponding to the detection current Is at its terminals and connected between the source of the transistor 75 and the power line 73. A voltage V1 at a common connection node N71 of the transistor 75 and the shunt resistor R72 is inputted to the voltage follower circuit 76.

The voltage follower circuit 76 includes a constant current source 79 and transistors T71 to T74. The constant current source 79 outputs a constant current Ia from a terminal of the power line 73 side to a terminal of the ground side. A collector of the PNP type bipolar transistor T71, which is a PNP type bipolar transistor, is connected to a terminal of the power line 73 side of the constant current source 79. The PNP type bipolar transistor T71 is in a diode-connected configuration. An emitter of the PNP type bipolar transistor T71 is connected to an emitter of the NPN type bipolar transistor T72, which is a PNP-type bipolar transistor. A collector and a base of the NPN type bipolar transistor T72 is connected to the power line 73 and a node N71, respectively.

A base of the PNP type bipolar transistor T73, which is a PNP type bipolar transistor, is connected to a terminal of the power line 73 side of the constant current source 79. A collector of the PNP type bipolar transistor T73 is connected to a current drawing circuit 77. An emitter of the PNP type bipolar transistor T73 is connected to an emitter of the NPN type bipolar transistor T74. The NPN type bipolar transistor T74 is in a diode-connected configuration. A collector and a base of the NPN type bipolar transistor T74 is connected to an output node N72 of the voltage follower circuit 76.

With the configuration described above, the output voltage V2 of the voltage follower circuit 76 generally equals the voltage value of the input voltage (refer to the equation (1)) similarly to the voltage follower circuit 5 during a period, in which the transistors T71 to T74 are in the on-states.

A current generation resistor R73 is provided to be supplied with an output voltage V2 of the voltage follower circuit 76. That is, the current generation resistor R73 is connected between the power line 73 and the output node N2 of the voltage follower circuit 76. With this configuration, a current Ir73, which corresponds to the voltage V2 ($\approx$V1) flows in the resistor 73.

A current drawing circuit 77 outputs the control current Icon, which corresponds to the current Ir73 flowing to the current generation resistor R73, to the gate control line 74. That is, the current drawing circuit 77 draws a negative control current (−Icon) from the gate control line 74 and includes the transistors M71 to M74. The transistors M71. and M72, which are N-channel type MOS transistors, form an input-side current mirror circuit 80.

Common-connected sources of the transistors M71 and M72 are connected to the ground. A gate and a drain of the transistor M1 are connected in common and connected to the collector of the PNP type bipolar transistor T73 of the voltage follower circuit 76. A drain of the transistor M72 is connected to a drain of the transistor M73.

The transistors M73 and M74, which are P-channel MOS transistors, form an output-side current mirror circuit 81. Common-connected sources of the transistors M73 and M74 are connected to the power line 73. A gate and a drain of the transistor M73 is connected in common. A drain of the transistor M74 is connected to the gate control line 74.

Resistances (resistance ratio) of the resistors R72 and R73 and sizes (size ratio) of the transistors M71 to M74 are set to satisfy the similar conditions of the resistances (resistance ratio) of the resistors R2 and R3 and the sizes (size ratio) of the transistors M1 to M4 of the first embodiment.

With this configuration, when the current equals the overcurrent detection threshold Ith, the control current Icon outputted from the current drawing circuit 77 becomes 1 mA. Thus a gate capacitance of the transistor 72 is not charged. As a result, the gate-source voltage Vgs of the transistor 72 becomes lower than the threshold voltage Vt and the transistor 72 is turned off. The current Im becomes zero. As described above, the seventh embodiment also provides the similar overcurrent protection operation as the first embodiment.

Other Embodiment

The overcurrent protection circuit is not limited to the foregoing embodiments, which are described above and shown in the drawings, but may be modified as follows.

The voltage follower circuit 52 in the fifth embodiment may be modified to have no transistors M51 and M52 in the same way as the voltage follower circuit 22 in the second embodiment. In this modification, the source of the P-channel type MOS transistor M52 is connected to the output terminal of the current source 9 and also to the gate of the N-channel type MOS transistor M53. The source of the N-channel type MOS transistor M53 is used as the output node. Similarly, the voltage follower circuit 76 in the seventh embodiment may be modified to have no transistors T71 and MT74 in the same way as the voltage follower circuit 22 in the second embodiment. In this modification, the emitter of the NPN type bipolar transistor T72 is connected to the terminal of the current source 79 and also to the base of the PNP type bipolar transistor T73. The emitter of the PNP type bipolar transistor T73 is used as the output node.

The voltage follower circuit 76 in the seventh embodiment may be modified such that the bipolar transistors may be replaced with MOS transistors in the same manner as the voltage follower circuit 52 in the fifth embodiment. The current drawing circuits 6, 42, 77, which are shown in FIG. 1, FIG. 4 and FIG. 7, need not have such configurations but may have configurations, which draw the control currents corresponding to the currents flowing from the current paths, which extend to the gate of the main switching element. Details of such configurations are changeable.

The main switching element, which is the subject of protection by the overcurrent protection circuit is not limited to the MOS transistor but may be an IGBT, for example, as far as it is a switching element having a gate.

What is claimed is:

1. An overcurrent protection circuit for limiting a current when a current flowing in a main switching element, which is driven by a gate driving circuit, exceeds an overcurrent detection threshold, the overcurrent protection circuit comprising:
    a sensing switching element configured to supply a detection current in proportion to a current flowing in the main switching element;
    a shunt resistor provided to generate a terminal voltage corresponding to the detection current;
    a voltage follower circuit for receiving the terminal voltage of the shunt resistor, the voltage follower circuit having, in a path from an input to an output thereof, a base-emitter path of a PNP type bipolar transistor and a base-emitter path of an NPN type bipolar transistor, which are connected to cancel out forward voltages of bipolar transistors;
    a current generation resistor for receiving an output voltage of the voltage follower circuit; and
    a current drawing circuit for drawing a control current, which corresponds to a current flowing in the current generation resistor, from a current path extending from the gate driving circuit to a gate of the main switching element.

2. The overcurrent protection circuit according to claim 1, wherein:
    the voltage follower circuit further has, in the path from the input to the output thereof, an emitter-base path of an NPN type bipolar transistor and an emitter-base path of a PNP type bipolar transistor.

3. The overcurrent protection circuit according to claim 1, further comprising:
    a feedback resistor provided in the current path, which extends from the gate driving circuit to the gate of the main switching element and different from a current path extending from the gate driving circuit to the gate of the sensing switching element, wherein the gate driving circuit is configured to drive the gate of the main switching element through the feedback resistor and drive a gate of the sensing switching element with a constant current.

4. The overcurrent protection circuit according to claim 2, further comprising:

a feedback resistor provided in the current path, which extends from the gate driving circuit to the gate of the main switching element and different from a current path extending from the gate driving circuit to the gate of the sensing switching element, wherein the gate driving circuit is configured to drive the gate of the main switching element through the feedback resistor and drive a gate of the sensing switching element with a constant current.

5. An overcurrent protection circuit for limiting a current when a current flowing in a main switching element, which is driven by a gate driving circuit, exceeds an overcurrent detection threshold, the overcurrent protection circuit comprising:

a sensing switching element configured to supply a detection current in proportion to a current flowing in the main switching element;

a shunt resistor provided to generate a terminal voltage corresponding to the detection current;

a voltage follower circuit for receiving the terminal voltage of the shunt resistor, the voltage follower circuit having, in a path from an input to an output thereof, a gate-source path of a P-channel type MOS transistor and a gate-source path of an N-channel type MOS transistor, which are connected to cancel out threshold voltages of MOS transistors;

a current generation resistor for receiving an output voltage of the voltage follower circuit; and a current drawing circuit for drawing a control current, which corresponds to a current flowing in the current generation resistor, from a current path extending from the gate driving circuit to a gate of the main switching element.

6. The overcurrent protection circuit according to claim 5, wherein:

the voltage follower circuit further has, in the path from the input to the output thereof, a source-gate path of an N-channel type MOS transistor and a source-gate path of a P-channel type MOS transistor.

7. The overcurrent protection circuit according to claim 5, further comprising:

a feedback resistor provided in the current path, which extends from the gate driving circuit to the gate of the main switching element and different from a current path extending from the gate driving circuit to the gate of the sensing switching element, wherein the gate driving circuit is configured to drive the gate of the main switching element through the feedback resistor and drive a gate of the sensing switching element with a constant current.

8. The overcurrent protection circuit according to claim 6, further comprising:

a feedback resistor provided in the current path, which extends from the gate driving circuit to the gate of the main switching element and different from a current path extending from the gate driving circuit to the gate of the sensing switching element, wherein the gate driving circuit is configured to drive the gate of the main switching element through the feedback resistor and drive a gate of the sensing switching element with a constant current.

* * * * *